(12) United States Patent
Watson

(10) Patent No.: US 8,342,551 B2
(45) Date of Patent: Jan. 1, 2013

(54) RETRACTABLE RUNNING BOARD/BOX SIDE STEP

(76) Inventor: Bradley Eugene Watson, Barrie (CA)

( * ) Notice: Subject to any disclaimer, the term of this patent is extended or adjusted under 35 U.S.C. 154(b) by 176 days.

(21) Appl. No.: 12/924,243

(22) Filed: Sep. 23, 2010

(65) Prior Publication Data

US 2011/0233889 A1  Sep. 29, 2011

Related U.S. Application Data

(60) Provisional application No. 61/340,955, filed on Mar. 25, 2010.

(51) Int. Cl.
*B60R 3/00* (2006.01)
(52) U.S. Cl. .......................................... 280/166; 280/163
(58) Field of Classification Search .................. 280/166, 280/164.1, 163, 169
See application file for complete search history.

(56) References Cited

U.S. PATENT DOCUMENTS

| | | | |
|---|---|---|---|
| 6,325,397 B1 | 12/2001 | Pascoe et al. | |
| 6,406,045 B1 * | 6/2002 | Farkash | 280/164.1 |
| 6,955,370 B2 * | 10/2005 | Fabiano et al. | 280/163 |
| 7,086,656 B2 * | 8/2006 | Kolpasky et al. | 280/164.1 |
| 7,318,596 B2 * | 1/2008 | Scheuring et al. | 280/166 |
| 7,367,574 B2 * | 5/2008 | Leitner | 280/166 |
| 7,377,531 B2 * | 5/2008 | Fabiano et al. | 280/163 |
| 7,413,205 B2 * | 8/2008 | Watson | 280/166 |
| 7,607,674 B2 * | 10/2009 | Watson | 280/166 |
| 7,637,519 B2 * | 12/2009 | Leitner et al. | 280/166 |
| 7,823,896 B2 * | 11/2010 | VanBelle et al. | 280/166 |
| 8,157,277 B2 * | 4/2012 | Leitner et al. | 280/166 |
| 2004/0100063 A1 * | 5/2004 | Henderson et al. | 280/166 |

* cited by examiner

*Primary Examiner* — Hau Phan
(74) *Attorney, Agent, or Firm* — Miller Canfield

(57) ABSTRACT

A running board assembly is provided for a motor vehicle having a passenger cab and a box. The running board assembly includes a housing assembly, a gear assembly disposed within the housing assembly, a running board operably coupled to the gear assembly and movable relative to the housing assembly between a stowed position tucked underneath the motor vehicle, a cab entry position generally outwardly from the motor vehicle to support a user entering or exiting the passenger cab, and a box side step disposed generally outwardly from the motor vehicle and rearward of the cab entry position to provide a user with side access to the box, and a motor operably coupled to the gear assembly for driving the gear assembly in opposing first and second directions to move the running board between the stowed position, the cab entry position, and the box side step position.

18 Claims, 13 Drawing Sheets

RETRACTABLE RUNNING BOARD/BOX SIDE STEP

CROSS-REFERENCE TO RELATED APPLICATION

This application claims the benefit of U.S. Provisional Application No. 61/340,955, filed Mar. 25, 2010.

BACKGROUND

The invention relates to a running board assembly for a motor vehicle. More particularly, the invention relates to a running board assembly including a running board movable between a stowed position, a cab entry position, and a box side step position.

SUMMARY

According to one aspect of the invention, a running board assembly is provided for a motor vehicle having a passenger cab and a box. The running board assembly includes a housing assembly, a gear assembly disposed within the housing assembly, a running board operably coupled to the gear assembly and movable relative to the housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of the cab entry position to provide a user with side access to the box, and a motor operably coupled to the gear assembly for driving the gear assembly in opposing first and second directions to move the running board between the stowed position, the cab entry position, and the box side step position.

According to another aspect of the invention, a running board assembly for a motor vehicle having a passenger cab and a box includes a housing assembly, a gear assembly disposed within the housing assembly, and a running board operably coupled to the gear assembly and movable relative to the housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of the cab entry position to provide a user with side access to the box. The running board assembly also includes a drive arm fixedly secured to the running board and operably coupled to the gear assembly, said drive arm including a first stop engageable with the running board to stop the running board in the stowed position and a second stop engageable with the running board to stop the running board in the box step side position. The running board assembly further includes a motor operably coupled to the gear assembly for driving the drive arm to pivotally move the running board between the stowed position, the cab entry position, and the box step side position, and an electronic control unit operably coupled to the motor and programmed to turn off the motor after a predetermined number of armature revolutions to stop the running board in the cab entry position.

According to yet another aspect of the invention, a running board assembly for a motor vehicle includes a mounting bracket adapted for attachment to the motor vehicle, a running board movable relative to the mounting bracket between a stowed position tucked underneath the motor vehicle, a cab entry position disposed generally outwardly from the motor vehicle, and a box side step position disposed generally outwardly from the motor vehicle and generally rearward to the cab entry position, a motor operably coupled to the running board for driving movement thereof, and an electronic control unit electronically connected to the motor and programmed to turn off said motor when said running board reaches said cab entry position. The running board assembly also includes a housing assembly including a worm member operably coupled to the motor. The housing assembly includes a zero backlash gear assembly having a lower gear fixedly mounted along a shaft and an upper gear freely mounted on the shaft for movement relative thereto. The zero backlash gear assembly includes a biasing member biasing the upper gear into engagement with the worm member to eliminate backlash of the running board when the running board is in the cab entry position.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EXEMPLARY EMBODIMENTS

Figure 1:
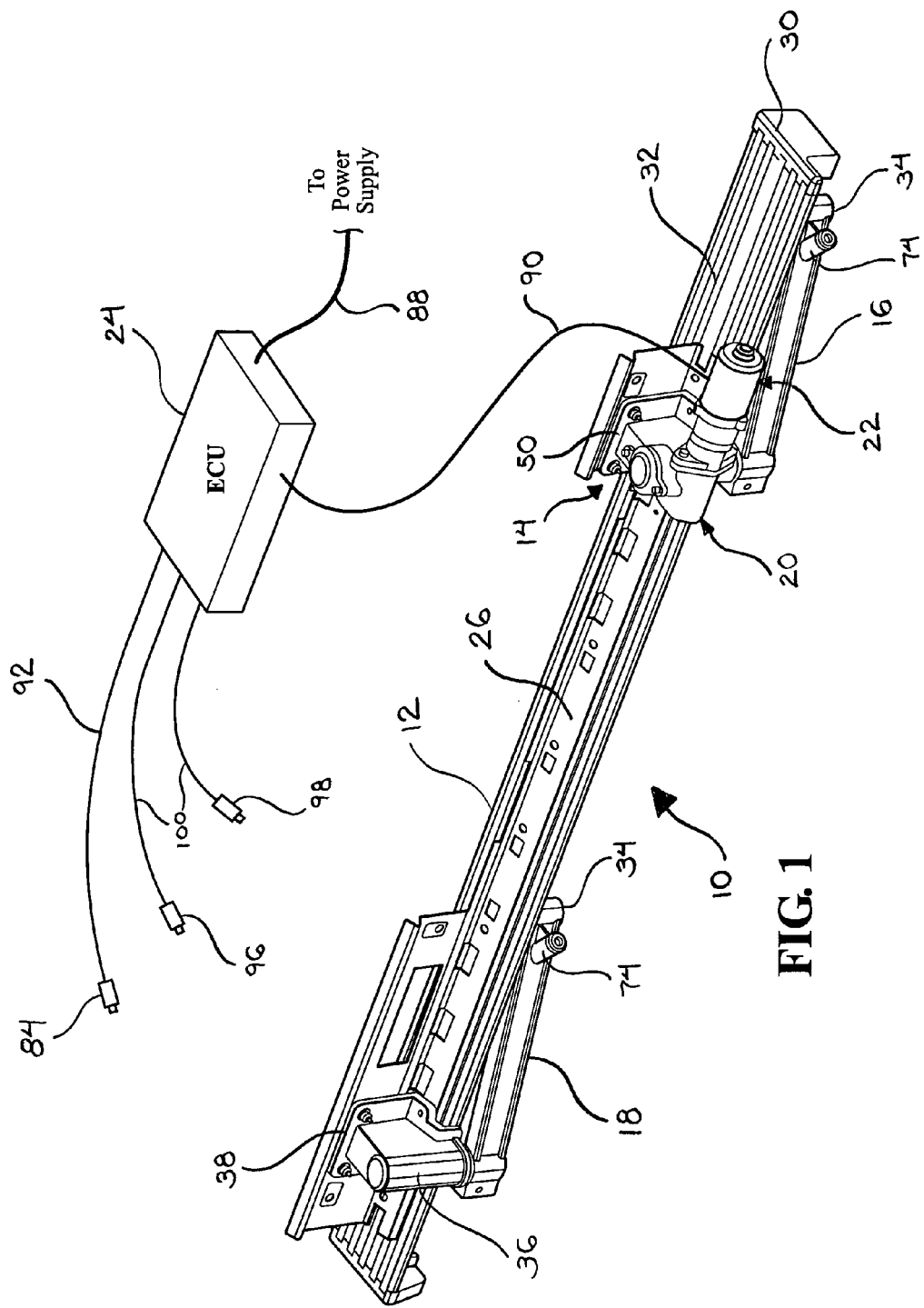
FIG. 1 is a perspective view of one embodiment of a running board assembly including a running board.

Referring to FIG. 1, a running board assembly, generally shown at 10, in one embodiment includes a running board 12, a housing assembly 14, a drive arm 16, an idler arm 18, a gear assembly 20, a motor assembly 22, an electronic control unit 24, and a mounting bracket 26. The mounting bracket 26 is adapted for attachment to a frame of a motor vehicle 28.

The running board 12 has a top wall 30 providing a tread surface 32 therealong. The running board 12 is connected to the drive 16 and idler 18 arms at pivots 34. The pivots 34 are arranged generally vertically and include a shaft extending through a bore in the end of the drive 16 and idler 18 arms and retained in place by a retaining ring. The idler arm 18 is mounted to a hub structure 36 which pivotally secures the idler arm 18 to a rear bracket 38. The rear bracket 38 is mounted to the mounting bracket 26 which is attached to the frame of the motor vehicle 28. It is appreciated that although a single idler arm 18 is shown, the running board assembly 10 in another embodiment may include more than one idler arm 18.

Figure 2:
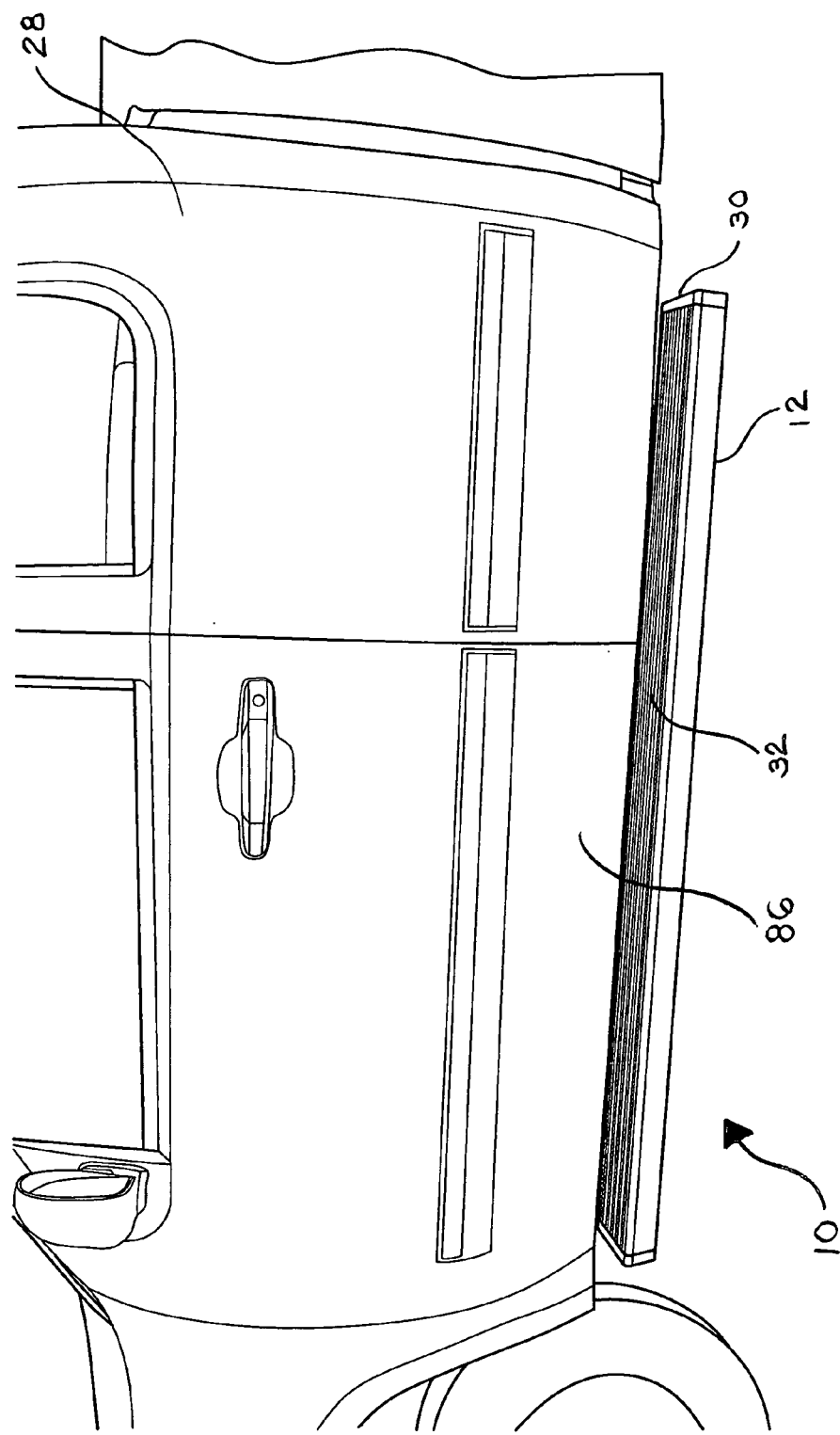
FIG. 2 is a side view of a motor vehicle including the running board in a stowed position.
Figure 3:
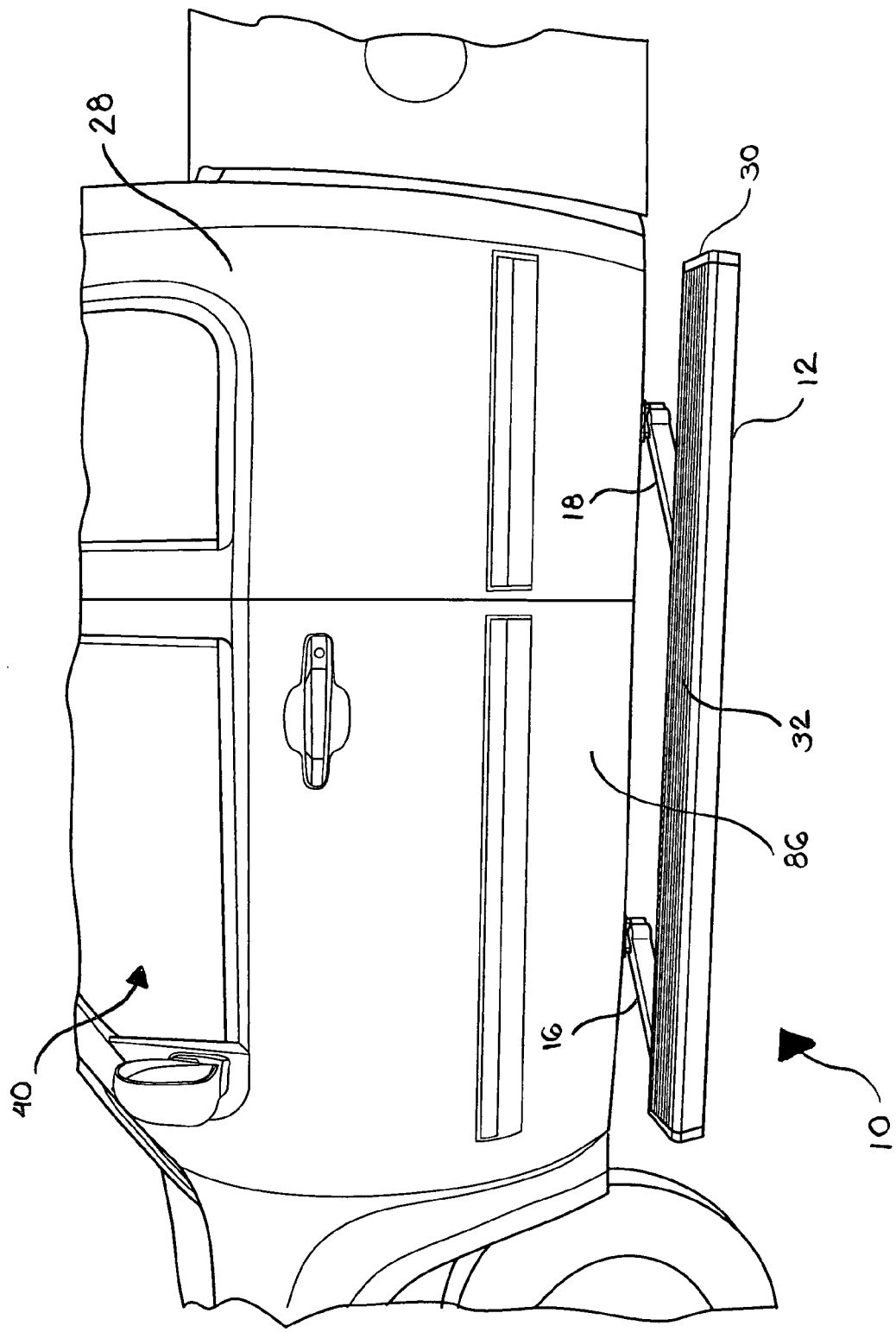
FIG. 3 is a side view of the motor vehicle including the running board in a cab entry position.
Figure 4:
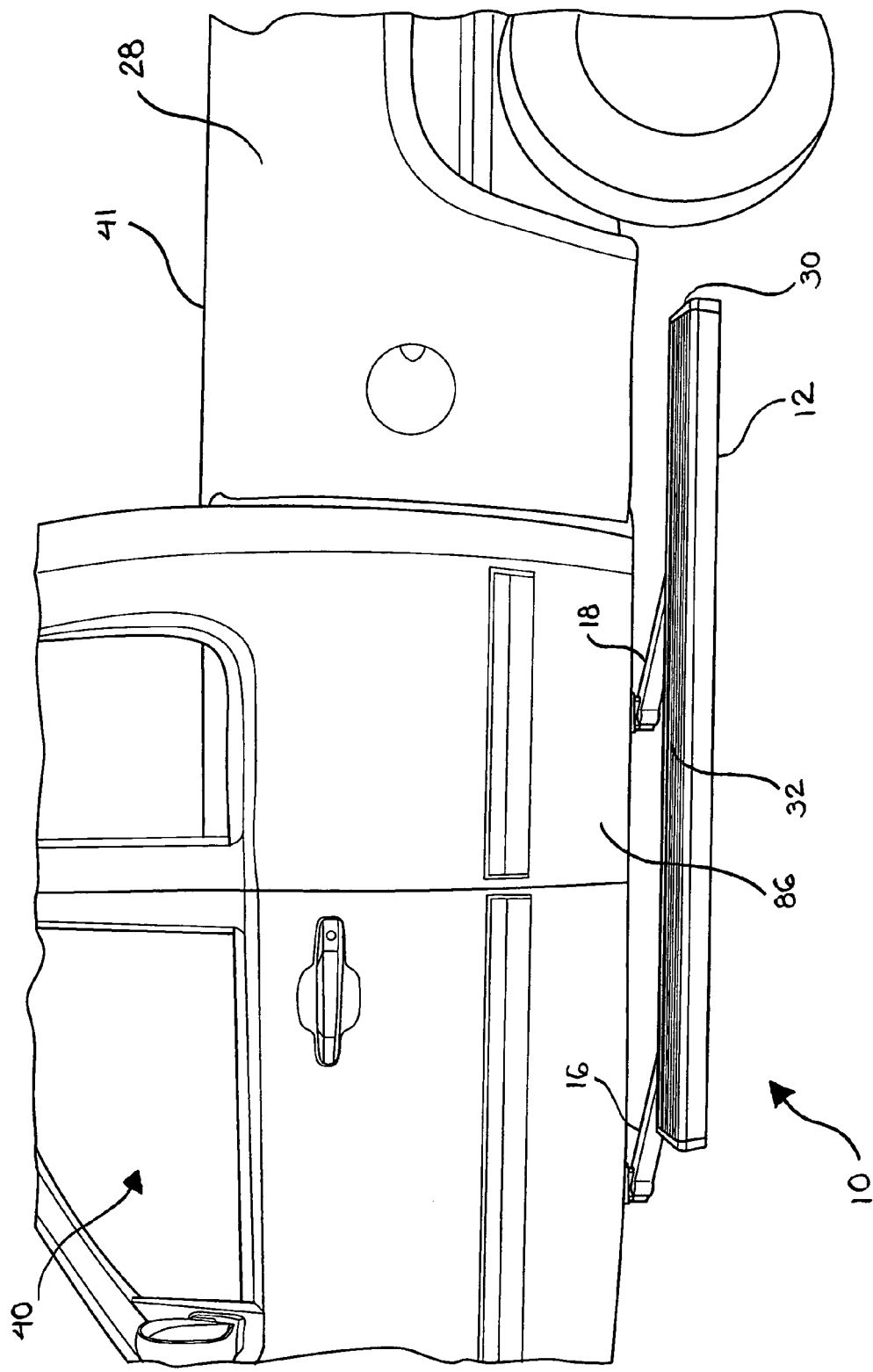
FIG. 4 is a side view of the motor vehicle including the running board in a box side step position.

The drive 16 and idler 18 arms form a parallel linkage which pivotally couples the running board 12 to a frame of the motor vehicle 28 for movement between a stowed position, as shown in FIG. 2, a cab entry position, as shown in FIG. 3, and a box side step position, as shown in FIG. 4. In the stowed position, the running board 12 is generally tucked underneath the motor vehicle 28 so as to be somewhat hidden from view and to provide a cleaner, more integrated look to the motor vehicle 28. In the cab entry position, the running board 12 extends generally outwardly from the motor vehicle 28 to assist users entering or exiting a passenger cab 40. And in the box side step position, the running board 12 extends generally outwardly from the motor vehicle 28 and is disposed rearward as compared to the cab entry position in order to allow users side access to a box 41 of the motor vehicle 28. The running board 12 provides a more useful step surface with improved step length for box access as compared to a separate frame mounted side step.

Figure 5:
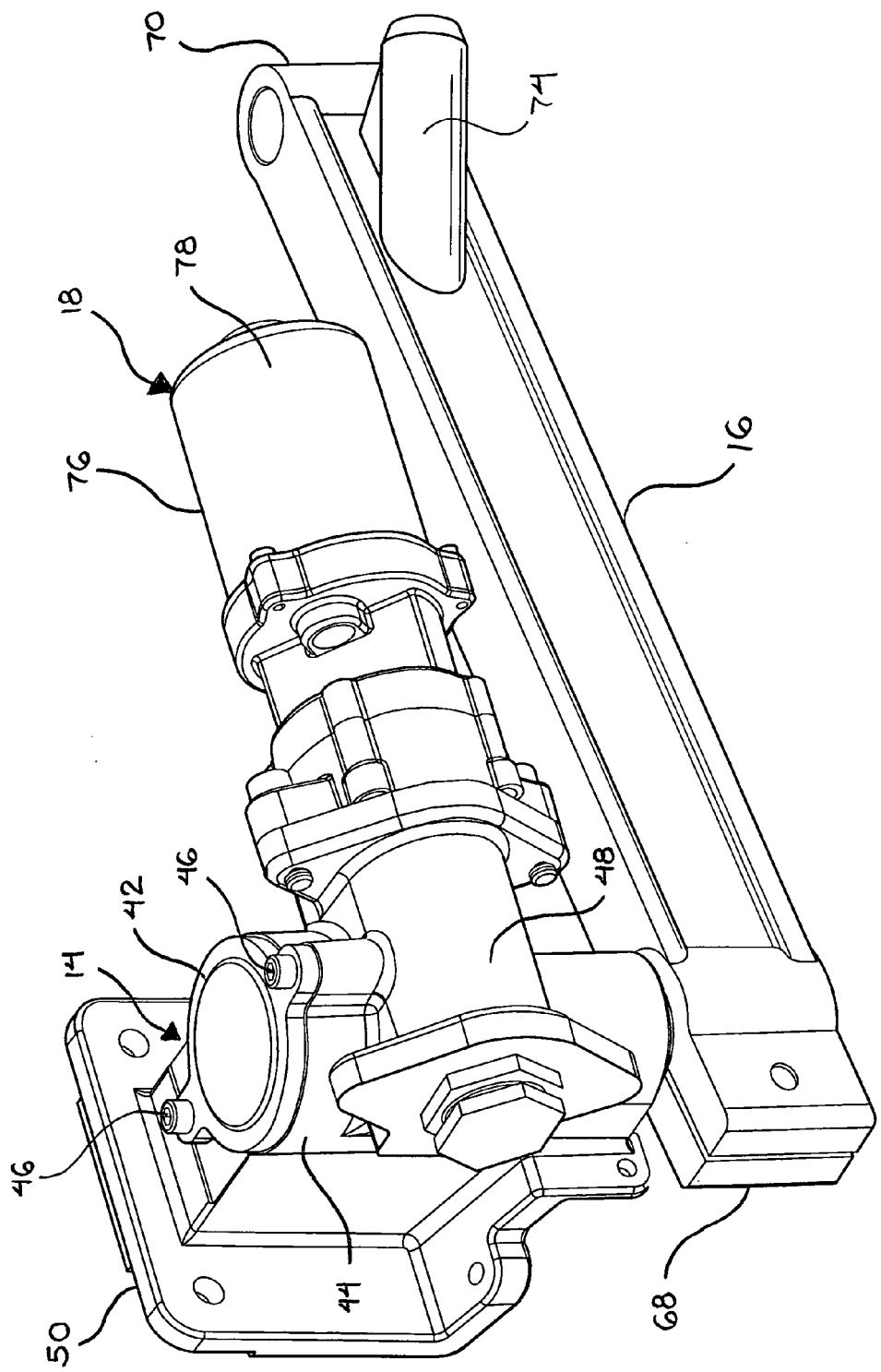
FIG. 5 is a perspective view of a housing assembly, a drive arm, and a motor assembly of the running board assembly.
Figure 6:
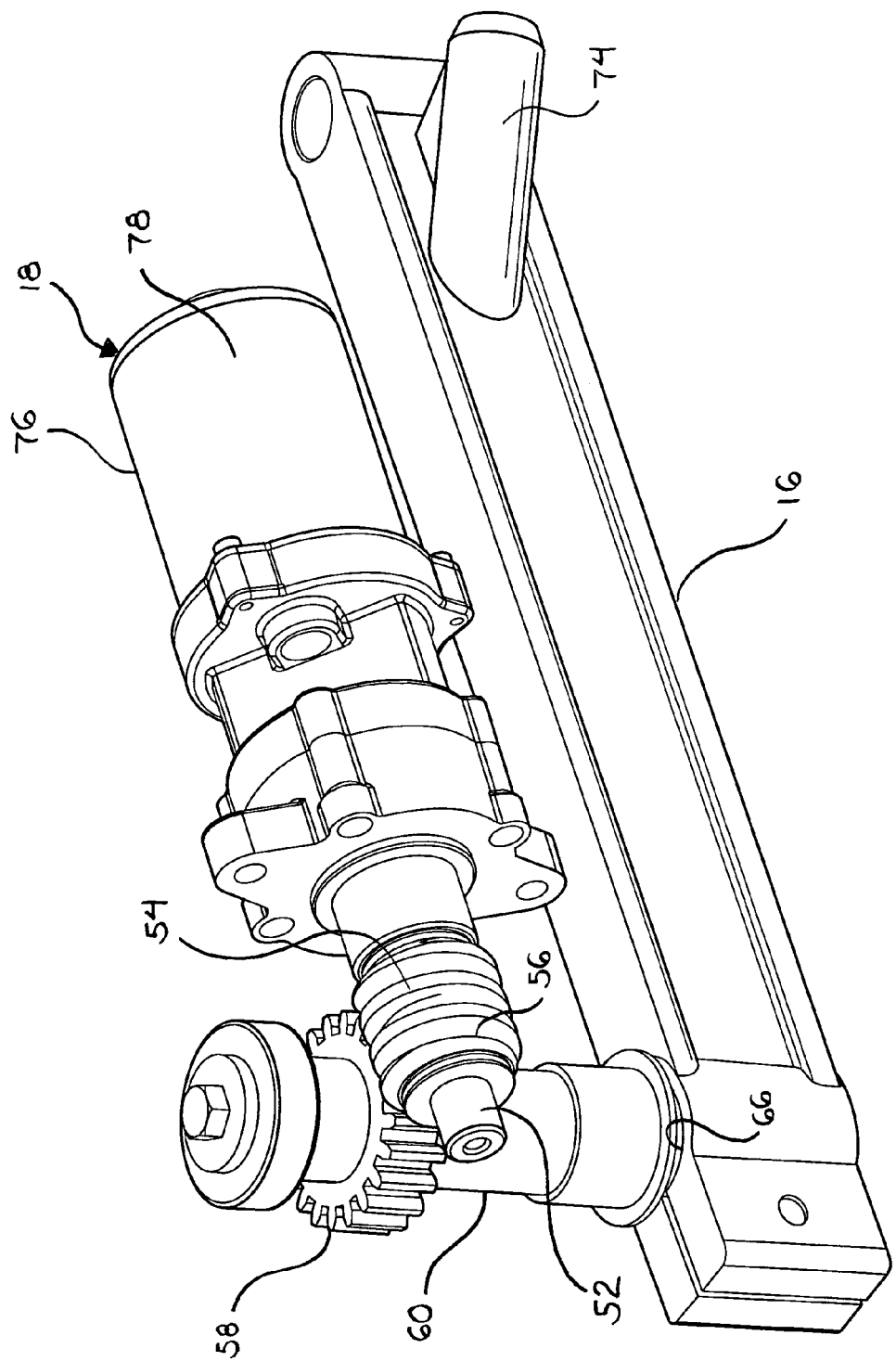
FIG. 6 is a perspective view of the housing assembly and the drive arm wherein a cover structure and a main housing structure have been removed to show a worm member in meshing engagement with a driven gear.
Figure 7:
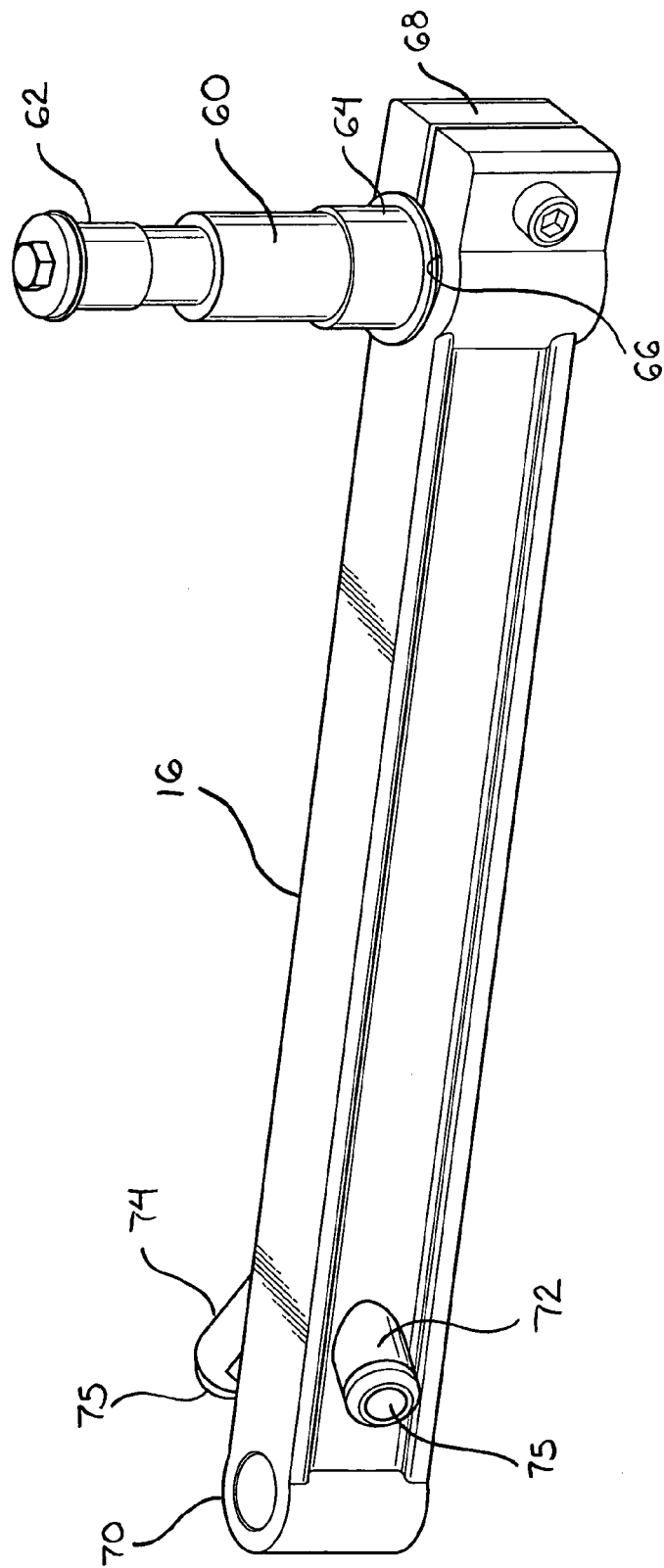
FIG. 7 is a perspective view of the drive arm of the running board assembly secured to a drive shaft.

Referring to FIGS. 5 through 7, the housing assembly 14 includes a cover structure 42 and a main housing structure 44. The cover structure 42 is secured to the main housing structure 44 by a plurality of cover screws 46. The cover structure 42 and the main housing structure 44 define an internal chamber within the housing assembly 14. The housing assembly 14 also includes a gear housing portion 48, and a rear bracket 50 which is secured to the mounting bracket 26.

The gear assembly 20 includes a worm drive shaft member 52 disposed within the gear housing portion 48 and rotatable relative thereto. The worm drive shaft member 52 is operably coupled to the motor assembly 18. A worm member 54 is fixedly mounted along the worm drive shaft member 52 for rotation therewith. The worm member 54 can be of any conventional configuration. A plurality of threads 56 is defined on an exterior cylindrical surface of the worm member 54.

The gear assembly 20 also includes a driven gear 58 in meshing engagement with the worm member 54. The driven gear 58 is fixedly supported along a drive shaft 60 proximate an upper end 62 thereof. Thus, the rotation of the worm member 54 will cause rotation of the drive shaft 60 via the driven gear 58. A lower end 64 of the drive shaft 60 is fixedly retained within a bore 66 formed in the drive arm 16. Thus, the rotation of the drive shaft 60 drives pivotal movement of the drive arm 16.

The drive arm 16 includes a first end 68 coupled to the drive shaft 60 and an opposing second end 70 coupled to the running board 12. The drive arm 16 includes a stow stop 72 and an end stop 74 formed at a location between the first 68 and second 70 ends. The running board 12 abuts the stow stop 72 to stop further movement of the running board 12 when the running board 12 has reached the stowed position. The running board 12 abuts the end stop 74 to stop further movement of the running board 12 when the running board 12 has reached the box side step position. In one embodiment, the stow 72 and end 74 stops include bumpers 75 which may be formed from urethane or a like material.

The motor assembly 18 includes a casing structure 76 which includes a conventional position sensing and encoding motor 78 that rotates a motor shaft (not shown) in opposing first and second directions. The motor assembly 18 is secured to the gear assembly 20. More particularly, the motor shaft extends into the gear housing portion 48 and is fixedly secured to the worm drive shaft member 52 such that activation of the motor 78 will rotate the worm drive shaft member 52 in the same direction. The casing structure 76 is secured to the gear housing portion 48 by a plurality of fasteners 82. It is appreciated that the casing structure 76 may in one embodiment be considered part of the housing assembly 12 as the housing assembly 12 maintains the gear and motor components sealed from the external environment.

Referring back to FIG. 1, the electronic control unit 24 electronically controls the motor assembly 22 to effect movement of the running board 12 between the stowed, cab entry, and box side step positions. The electronic control unit 24 is mounted within the motor vehicle 28 at a location remote from the housing assembly 14. The electronic control unit 24 is electrically connected to the motor assembly 22, to a wiring harness of the motor vehicle 28, and to a switch member 84 incorporated into a door 86 of the motor vehicle 28. In another embodiment, the electronic control unit 24 may be physically mounted to the housing assembly 14 or to the motor assembly 22, and electronically connected to the motor assembly 22.

The switch member 84 in one embodiment is a door-actuated switch member that is part of the motor vehicle 28 and is controlled in a conventional manner by the door 86. The wiring harness supplies the electrical power from the vehicle electrical system to the electronic control unit 24 of the running board assembly 10 through electrical wire members 88. The structure and operation of a conventional switch member which is operationally interconnected to the vehicle door 86 is well known. It is understood by one skilled in the art that such switch members are toggled by the opening or the closing of the vehicle door 86 associated therewith to open and close an electrical circuit. Wire members 90 provide electrical connection between the electronic control unit 24 and the motor assembly 22 so that the electronic control unit 24 can supply electrical power from the vehicle electrical system to the motor assembly 22 to effect the bi-directional operation thereof. Wire members 92 provide electrical communication between the electronic control unit 24 and the door-actuated switch member 84.

In one embodiment, the switch member 84 is a door ajar switch in a door latch. The motor assembly 22 is energized to move the running board 12 from the stowed position to the cab entry position upon receiving a signal from the door ajar switch indicating that the vehicle door 86 has been opened. The motor assembly 22 is energized to return the running board 12 to the stowed position upon receiving a signal from the door ajar switch indicating that the vehicle door 86 has been closed.

Figure 8:
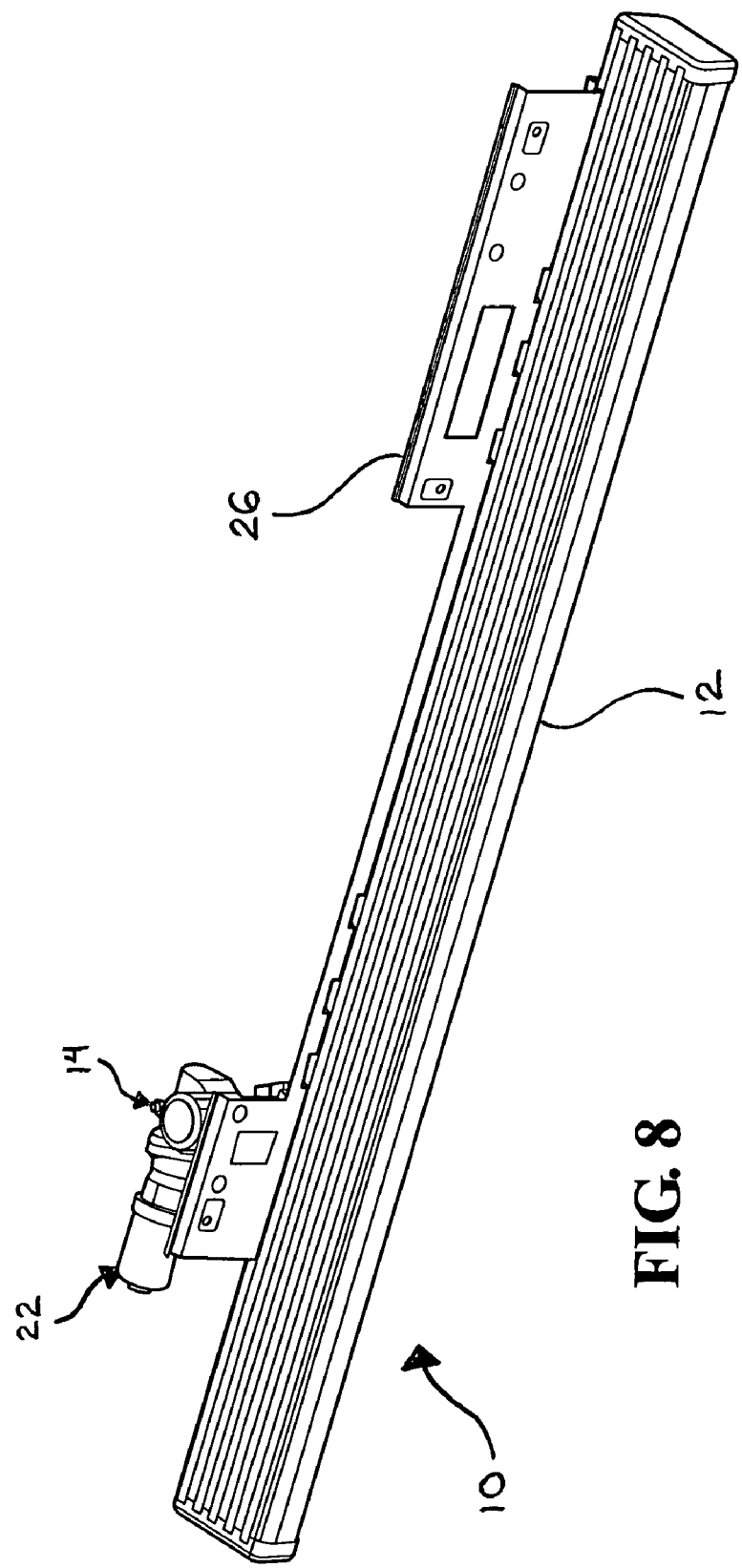
FIG. 8 is a perspective view of the running board assembly including the running board in the stowed position.
Figure 9:
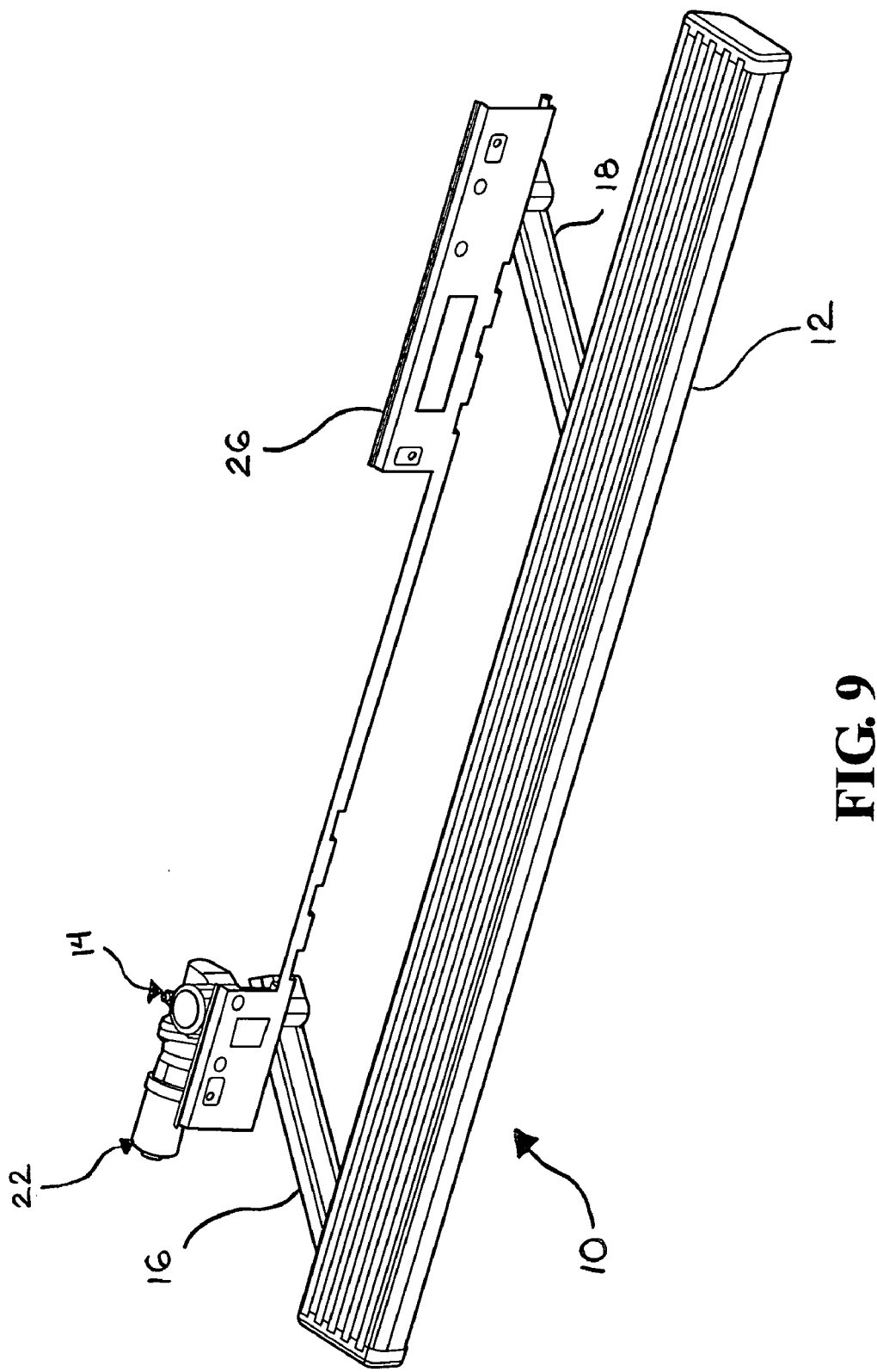
FIG. 9 is a perspective view of the running board assembly including the running board in the cab entry position.
Figure 10:
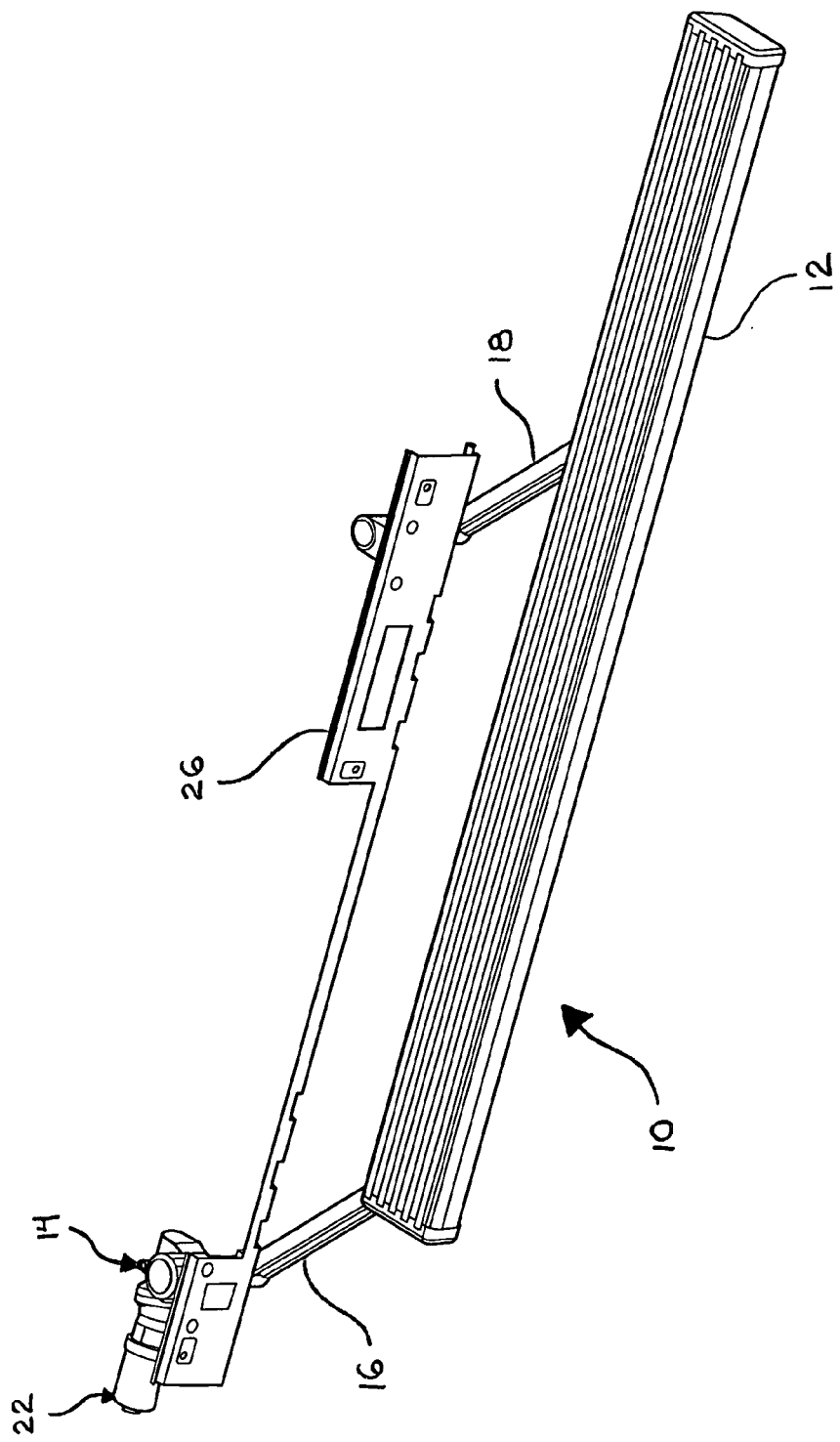
FIG. 10 is a perspective view of the running board assembly including the running board in the box side step position.
Figure 11:
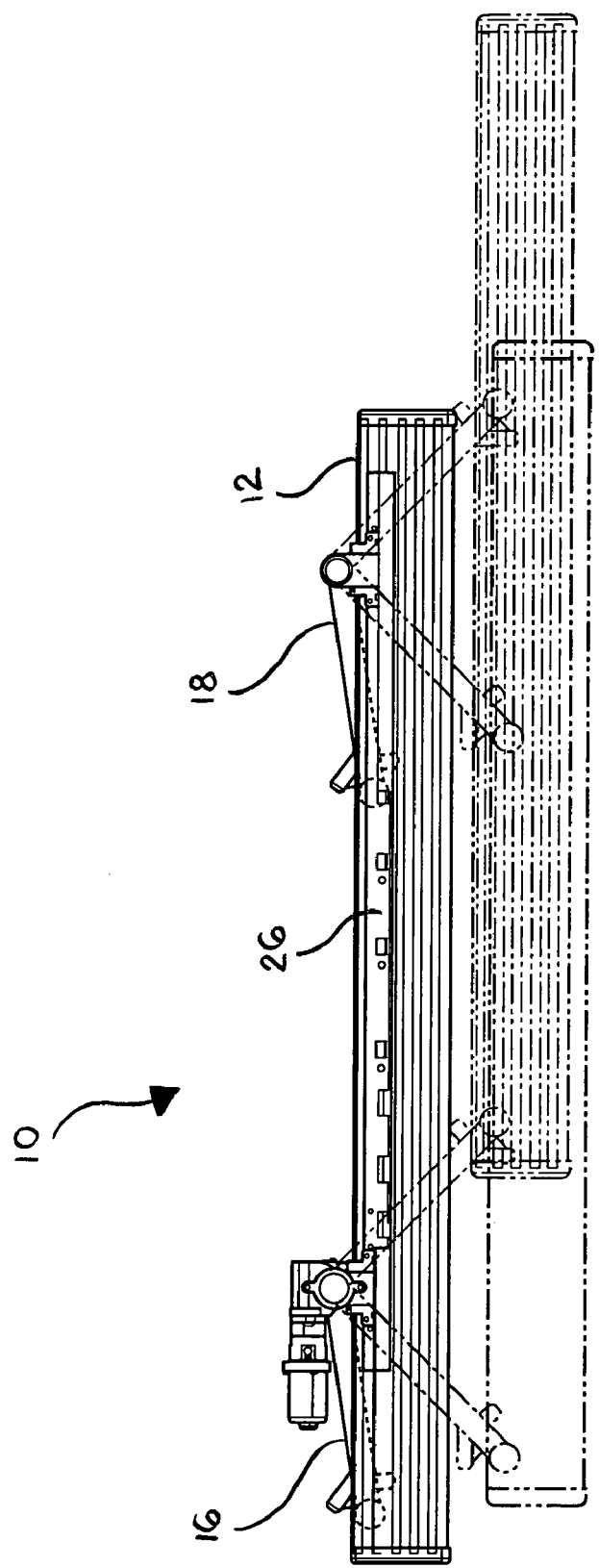
FIG. 11 is a top view of the running board assembly showing the running board in the stowed, cab entry, and box side step positions.

In operation, starting with the running board 12 in the stowed position shown in FIG. 8, when the vehicle door 86 is unlatched and pivoted outwardly from a closed position to an open position, the switch member 84 associated with the vehicle door 86 is activated and sends a control signal to the electronic control unit 24. The electronic control unit 24 in response to the control signal supplies an appropriate voltage to the motor assembly 22 to cause the motor assembly 22 to begin rotational movement in a first rotational direction which will pivot the drive arm 16 to move the running board 12 to the cab entry position. Specifically, the motor 78 rotates the worm drive shaft member 52 in a first rotational direction which in turn rotates the worm member 54. The worm member 54 rotates the driven gear 58. The drive shaft 60 rotates with the driven gear 58 and causes the drive arm 16 to pivot outwardly away from the motor vehicle 28 to move the running board 12 to the cab entry position. The particular location of the running board 12 in the cab entry position is electronically controlled by the motor 78. The electronic control unit 24 is programmed to stop the motor 78 after a predetermined number of armature revolution counts. As a result, the exact location of the running board 12 in the cab entry position may vary depending upon when the motor 78 is programmed to stop. When the electronic control unit 24 senses that the running board 12 has reached the cab entry position, the electronic control unit 24 turns off the motor 78.

The running board 12 is retained in the cab entry position after the motor assembly 22 is shut off as a result of the meshing engagement between the worm member 54 and the driven gear 58, as it is known that the worm member 54 will not be back-driven by the driven gear 58. Thus, the worm member 54 will resist an external force applied to the drive arm 16 in a direction away from the cab entry position and towards the stowed position as a result of the meshing engagement.

The running board 12 remains in the cab entry position until the door 86 of the motor vehicle 28 is returned to the closed position. When the door 86 is pivoted inwardly from the open position to the closed position, the switch member 84 associated therewith is activated and sends a signal to the electronic control unit 24. The electronic control unit 24 in response to the signal supplies an appropriate voltage to the motor assembly 22 which will pivot the drive arm 16 to move the running board 12 to the stowed position. Specifically, the motor shaft 80 of the motor assembly 22 rotates the worm drive shaft member 52 in a second rotational direction which in turn rotates the worm member 54. The worm member 54 rotates the driven gear 58. The drive shaft 60 rotates with the driven gear 58 and drives the drive arm 16 to pivot inwardly towards the motor vehicle 28 to move the running board 12 to the stowed position. The stow stop 72 and the electronic control unit 24 are used to turn off the motor 78 of the motor assembly 22. The running board 12 will continue to move towards the stowed position until the running board 12 abuts the stow stop 72 on the drive arm 60. A current spike is generated in the motor assembly 22 as a result of the motor assembly 22 meeting a resistance to movement when the running board 12 hits the stow stop 72. The current spike will be instantaneously detected by the electronic control unit 24. In response to the current spike, the electronic control unit 24 turns off the motor 78.

Figure 12:
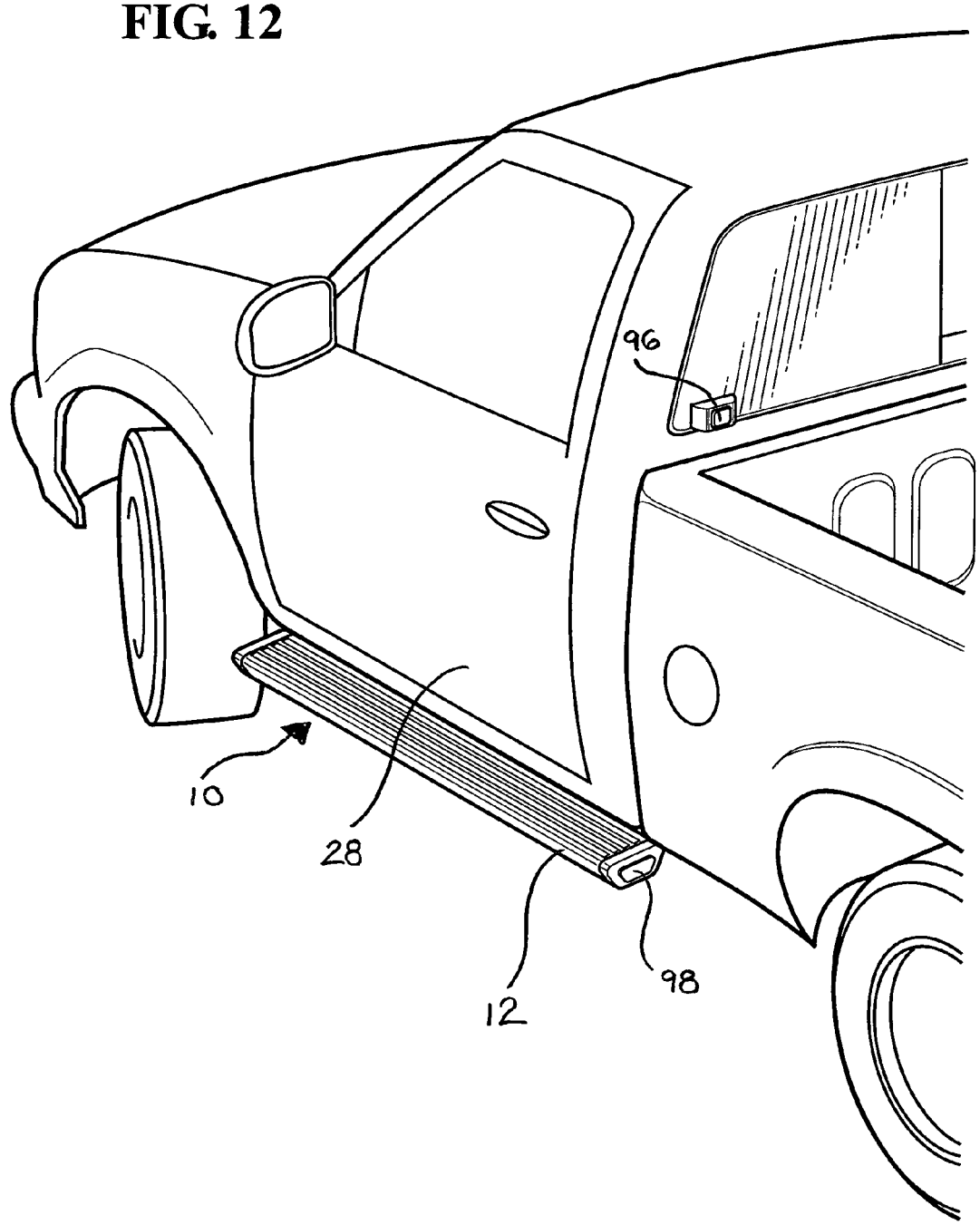
FIG. 12 is a fragmentary rear perspective view of the motor vehicle including an end cap switch, a body-mounted switch, and a key fob for activating movement of the running board into and out of the box side step position.

Referring to FIG. 12, the motor vehicle 28 may include an input member such as a body-mounted switch 96, an end cap switch 98, or a key fob (not shown) to initiate movement of the running board 12 into and out of the box side step position. The body-mounted switch 96 and the end cap switch 98 may be electrically connected to the electronic control unit 24 by wire members 100 or by a wireless connection. The body-mounted switch 96 is easily accessible by hand and the end cap switch 98 may be accessed by a user's foot. Thus, the running board 12 may be hand-operated, or foot-operated if hands-free operation of the running board 12 is desired. The running board 12 may be moved into the box side step position from either the stowed position or the cab entry position. Upon activation of one of the switches 96, 98 or the key fob, a signal is sent to the electronic control unit 24. The electronic control unit 24 in response to the signal supplies an appropriate voltage to the motor assembly 22 to cause rotational movement in a first direction which will pivot the drive arm 16 to move the running board 12 to the box side step position. The running board 12 will continue to move towards the box side step position until the running board 12 abuts the end stop 74 on the drive arm 16. A current spike is generated in the motor assembly 22 as a result of the motor assembly 22 meeting a resistance to movement when the running board 12 hits the end stop 74. The current spike will be instantaneously detected by the electronic control unit 24. In response to the current spike, the electronic control unit 24 turns off the motor 78.

To move the running board 12 out of the box side step position and into the stowed position, the body-mounted switch 96, the end cap switch 98, or the key fob is activated which sends a signal to the electronic control unit 24. The electronic control unit 24 in response to the signal supplies an appropriate voltage to the motor assembly 22 to cause rotational movement in a second rotational direction which will pivot the drive arm 16 to move the running board 12 to the stowed position. Specifically, the motor 78 rotates the worm drive shaft member 52 in a second rotational direction which in turn rotates the worm member 54. The worm member 54 rotates the driven gear 58. The drive shaft 60 rotates with the driven gear 58 and drives the drive arm 16 to pivot inwardly towards the motor vehicle 28 to move the running board 12 to the stowed position. The running board 12 reaches the stowed position when the running board 12 abuts the stow stop 72 on the drive arm 16. A current spike is generated in the motor assembly 22 as a result of the motor assembly 22 meeting a resistance to movement when the running board 12 hits the stow stop 72. The current spike will be instantaneously detected by the electronic control unit 24. In response to the current spike, the electronic control unit 24 turns off the motor 78. It is further contemplated that in the alternative the running board 12 may be moved from the box side step position to the cab entry position.

Figure 13:
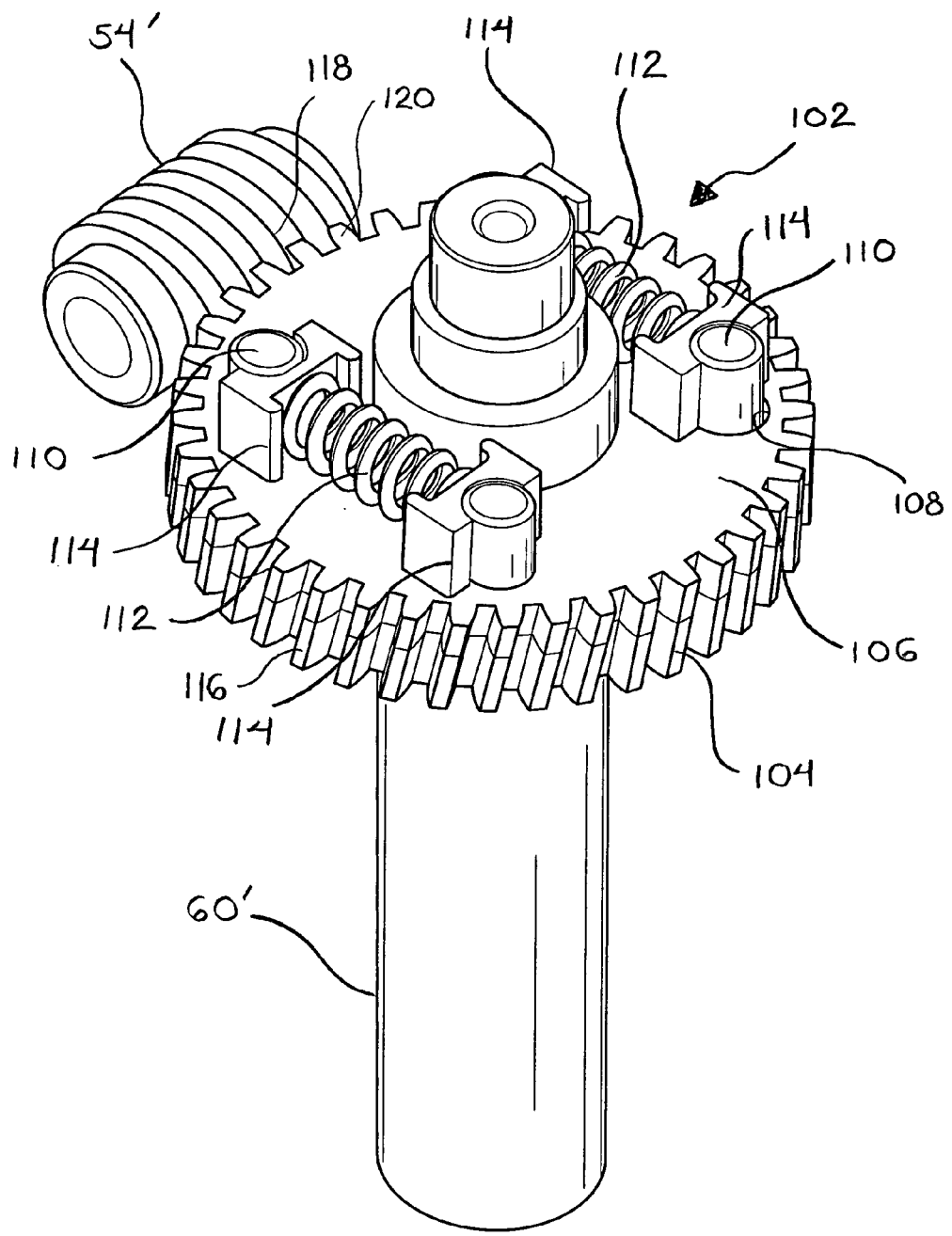
FIG. 13 is a perspective view of a zero backlash gear assembly operably coupled to the worm member in a running board assembly according to another embodiment.

Referring to FIG. 13, wherein like primed reference numerals represent similar elements as those set forth above, the running board assembly 10' according to a second embodiment includes a zero backlash gear assembly, generally indicated at 102, operably coupled between the worm member 54' and the drive shaft 60' to eliminate backlash in the running board assembly 10' when the running board assembly 10' is in the cab entry position. The zero backlash gear assembly 102 includes a lower gear 104 fixedly mounted along the drive shaft 60' for rotation therewith, and an upper gear 106 freely supported along the drive shaft 60' for rotation relative to the lower gear 104. The upper gear 106 defines at least one clearance hole 108 for receiving a pin 110 of the lower gear 104 therethrough. The clearance hole 108 is sized to allow rotation of the upper gear 106 relative to the lower gear 104. The upper gear 106 includes biasing members 112 each extending between a pair of support members 114. It is appreciated that the particular number of biasing members 112 may vary. The biasing members 112 preload the upper gear 106 into rotation relative to the lower gear 104. When the running board 12' reaches the cab entry position, the zero backlash gear assembly 102 prevents backlash in the system as teeth 116 on the lower gear 104 engage one side of teeth 118 on the worm member 54' and teeth 120 on the upper gear 106 engage the other side of the teeth 118 on the worm member 54'. As a result, when a user steps on the running board 12 in the cab entry position, the user will not feel any variation in the running board 12 and the user will have a better tactile feel on the running board 12.

The invention has been described in an illustrative manner. It is to be understood that the terminology, which has been used, is intended to be in the nature of words of description rather than of limitation. Many modifications and variations of the invention are possible in light of the above teachings.

Therefore, within the scope of the appended claims, the invention may be practiced other than as specifically described.

What is claimed:

1. A running board assembly for a motor vehicle having a passenger cab and a box, said running board assembly comprising:
   a housing assembly;
   a gear assembly disposed within said housing assembly;
   a running board operably coupled to said gear assembly and movable relative to said housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of said cab entry position to provide a user with side access to the box, wherein said cab entry position is between said stowed position and said box side step position; and
   a motor operably coupled to said gear assembly for driving said gear assembly in opposing first and second directions to move said running board between said stowed position, said cab entry position, and said box side step position.

2. The running board assembly as set forth in claim 1 including a drive arm operably coupled to said gear assembly and fixedly secured to said running board for pivotally moving said running board between said stowed, cab entry, and box side step positions.

3. The running board assembly as set forth in claim 2 wherein said gear assembly includes a rotatable worm drive shaft member operably coupled to said motor.

4. The running board assembly as set forth in claim 3 wherein said housing assembly includes a rotatable drive shaft operably coupled to said worm drive shaft member and fixedly secured to said drive arm.

5. The running board assembly as set forth in claim 4 wherein said gear assembly includes a worm member fixedly mounted along said worm drive shaft member.

6. The running board assembly as set forth in claim 5 including a driven gear fixedly mounted to said drive shaft and in meshing engagement with said worm member.

7. The running board assembly as set forth in claim 2 wherein said drive arm includes a first stop engageable with said running board to stop said running board in said stowed position and a second stop engageable with said running board to stop said running board in said box step side position.

8. The running board assembly as set forth in claim 1 including an electronic control unit operably coupled to said motor and electronically controlling operation thereof.

9. The running board assembly as set forth in claim 8 wherein said electronic control unit is programmed to turn off said motor after a predetermined number of armature revolutions to stop said running board in said cab entry position.

10. A running board assembly for a motor vehicle having a passenger cab and a box, said running board assembly comprising:
    a housing assembly;
    a gear assembly disposed within said housing assembly;
    a running board operably coupled to said gear assembly and movable relative to said housing assembly between a stowed position tucked underneath the motor vehicle, a cab entry position generally outwardly from the motor vehicle to support a user entering or exiting the passenger cab, and a box side step position disposed generally outwardly from the motor vehicle and rearward of said cab entry position to provide a user with side access to the box;
    a drive arm fixedly secured to said running board and operably coupled to said gear assembly, said drive arm including a first stop engageable with said running board to stop said running board in said stowed position and a second stop engageable with said miming board to stop said running board in said box step side position;
    a motor operably coupled to said gear assembly for driving said drive arm to pivotally move said running board between said stowed position, said cab entry position, and said box step side position; and
    an electronic control unit operably coupled to said motor and programmed to turn off said motor after a predetermined number of armature revolutions to stop said miming board in said cab entry position.

11. A running board assembly as set forth in claim 10 including a switch member transmitting a signal to said electronic control unit to move said running board between said stowed and cab entry positions upon the opening and closing of a motor vehicle door.

12. A running board assembly as set forth in claim 10 including a switch member electronically connected to said electronic control unit and providing a signal thereto for moving said miming board into and out of said box side step position.

13. A running board assembly for a motor vehicle having a passenger cab and a box, said running board assembly comprising:
    a mounting bracket adapted for attachment to the motor vehicle;
    a running board movable relative to said mounting bracket between a stowed position tucked underneath the motor vehicle, a cab entry position disposed generally outwardly from the motor vehicle to support a user entering or exiting the passenger cab, and a box side step position disposed generally outwardly from the motor vehicle and generally rearward to said cab entry position to provide a user with side access to the box;
    a motor operably coupled to said miming board for driving movement thereof;
    an electronic control unit electronically connected to said motor, said electronic control unit selectively programmable to turn off said motor to stop said running board in said cab entry position; and
    a housing assembly including a rotatable worm member operably coupled to said motor, said housing assembly including a zero backlash gear assembly having a lower gear fixedly mounted along a rotatable drive shaft and in meshing engagement with said worm member, said zero backlash gear assembly also including an upper gear freely mounted on said shaft for movement relative to said lower gear, said zero backlash gear assembly including a biasing member biasing said upper gear into engagement with said worm member to eliminate backlash of said running board when said running board is in said cab entry position.

14. A running board assembly as set forth in claim 13 including a switch member electronically connected to said electronic control unit and providing a signal thereto for moving said running board into and out of said box side step position.

15. The running board assembly as set forth in claim 13 including a drive arm operably coupled to said gear assembly and fixedly secured to said running board for pivotally moving said running board between said stowed, cab entry, and box side step positions.

16. The running board assembly as set forth in claim 15 wherein said drive arm includes a first stop engageable with said running board to stop said running board in said stowed position and a second stop engageable with said running board to stop said running board in said box step side position.

17. The running board assembly as set forth in claim 13 wherein said upper gear defines a clearance hole for receiving a pin mounted on said lower gear therethrough to allow rotation of said upper gear relative to said lower gear.

18. The running board assembly as set forth in claim 17 wherein teeth on said lower gear meshingly engage one side of teeth on said worm member and teeth on said upper gear meshingly engage another side of said teeth on said worm member.

\* \* \* \* \*